United States Patent
Paran et al.

(10) Patent No.: US 11,430,017 B1
(45) Date of Patent: Aug. 30, 2022

(54) SYSTEM, METHOD, AND COMPUTER PROGRAM FOR EDGE REAL-TIME BIDDING (RTB)

(71) Applicant: Amdocs Development Limited, Limassol (CY)

(72) Inventors: Eran Yosef Paran, Hod Hasharon (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 213 days.

(21) Appl. No.: 16/011,433

(22) Filed: Jun. 18, 2018

(51) Int. Cl.
*G06Q 30/02* (2012.01)
(52) U.S. Cl.
CPC ..... *G06Q 30/0275* (2013.01); *G06Q 30/0251* (2013.01); *G06Q 30/0277* (2013.01)
(58) Field of Classification Search
CPC ........................................ G06Q 30/0207–0277
See application file for complete search history.

(56) References Cited

U.S. PATENT DOCUMENTS

| 9,674,567 | B1* | 6/2017 | Carter | H04N 21/812 |
| 2008/0021835 | A1* | 1/2008 | Ginter | H04N 21/435 |
| | | | | 705/51 |
| 2013/0238751 | A1* | 9/2013 | Raleigh | G06Q 30/0276 |
| | | | | 709/217 |
| 2013/0246311 | A1* | 9/2013 | Lee | G06Q 30/0207 |
| | | | | 705/400 |
| 2014/0058848 | A1* | 2/2014 | Jian | G06Q 30/0275 |
| | | | | 705/14.71 |
| 2014/0278981 | A1* | 9/2014 | Mersov | G06Q 30/08 |
| | | | | 705/14.53 |
| 2016/0180377 | A1* | 6/2016 | Kang | G06Q 30/0249 |
| | | | | 705/14.43 |
| 2017/0178193 | A1* | 6/2017 | Jagannath | G06Q 30/04 |

* cited by examiner

*Primary Examiner* — Chrystina E Zelaskiewicz
(74) *Attorney, Agent, or Firm* — Zilka-Kotab, P.C.

(57) ABSTRACT

A method of serving Real Time Bidding (RTB) requests received from client devices at a network edge node, comprising an edge node located at an edge of a network serving one or more client devices for obtaining a dataset associating each of a plurality of cached ADs stored in edge storage device(s) locally accessible to the edge node with one or more user attributes, receiving, from the client device(s), RTB request(s) for impression(s) in AD placement(s) presented by the client device(s) to respective user(s), each RTB request comprising user attribute(s) of the respective user, serving in response to each RTB request, to the respective client device, one of the cached ADs associated with the user attribute(s) of the respective RTB request or forwarding the respective RTB request to an RTB server when none of the cached ADs is associated with the user attribute(s) of the respective RTB request.

4 Claims, 6 Drawing Sheets

SYSTEM, METHOD, AND COMPUTER PROGRAM FOR EDGE REAL-TIME BIDDING (RTB)

BACKGROUND

The present invention, in some embodiments thereof, relates to serving to real time bidding (RTB) requests at a network edge node, and, more specifically, but not exclusively, to serving to RTB requests at a network edge node based on availability of matching ADs at an edge storage.

Online advertisement has long become one of the main advertisement channels and often considered the most effective channel.

In order to effectively target advertisement (ADs) for specific users in real time highly sophisticated and complex platforms have be constructed based on advanced algorithms which are constantly evolving.

A key element in the real time advertisement trade is Real Time Bidding (RTB) in which publishers of online content offer for sale impressions at AD placements embedded in the online content. The impression sale offers designated RTB requests may be transmitted by automated platforms associated with the publishers, for example, a Supply Side Platform (SSP) and/or the like to one or more AD exchanges. The AD exchanges may conduct AD auctions in real time by distributing the RTB requests to a plurality of automated platforms associated with a plurality of advertisers, for example, a Demand Side Platform (DSP) and/or the like.

In response the AD exchange may receive from the DSPs a plurality of bid offers for the RTB requests where each of the bid offers is associated with a respective one of a plurality of ADs and for each RTB request a bid offer estimated to produce best value may be selected. The best value bid offer may be estimated by multiplying the offered price of each of the bid offers with the probability of conversion of the respective associated ADs. The AD associated with the highest bidding offer may then be served at the respective AD placements for which the RTB requests were issued.

SUMMARY

According to a first aspect of the present invention there is provided a computer implemented method of serving Real Time Bidding (RTB) requests received from client devices at a network edge node, comprising executing a code by one or more processors of an edge node located at an edge of a network serving one or more client devices for:

Obtaining a dataset associating each of a plurality of cached ADs stored in one or more edge storage devices locally accessible to the edge node with one or more of a plurality of user attributes.

Receiving, from the one or more client devices via the network, one or more RTB requests for impression(s) in one or more AD placements presented by the client device(s) to respective user(s). Each RTB request comprising one or more of the plurality of user attributes of the respective user.

Serving, to the respective client device, one of the plurality of cached ADs in case the cached AD is associated with the user attribute(s) of the respective RTB request.

Forwarding the respective RTB request to an RTB server in case none of the plurality of cached ADs is associated with the with the user attribute(s) of the respective RTB request.

According to a second aspect of the present invention there is provided a system for serving Real Time Bidding (RTB) requests received from client devices at a network edge node, comprising:

A storage storing a code.

One or more processors of an edge node located at an edge of a network serving one or more client devices, the one or more processors is coupled to the storage for executing the stored code, the code comprising:

Code instructions to obtain a dataset associating each of a plurality of cached ADs stored in one or more edge storage devices locally accessible to the edge node with one or more of a plurality of user attributes.

Code instructions to receive, from the one or more client devices via the network, one or more RTB requests for impression(s) in one or more AD placements presented by the client device(s) to respective user(s). Each RTB request comprising one or more of the plurality of user attributes of the respective user.

Code instructions to serve, to the respective client device, one of the plurality of cached ADs in case the respective cached AD is associated with the user attribute(s) of the respective RTB request.

Code instructions to forward the respective RTB request to an RTB server in case none of the plurality of cached ADs is associated with the user attribute(s) of the respective RTB request.

First by conducting the RTB at the network edge the latency (response time) for serving the ADs to the client devices may be significantly reduced. This may significantly improve the user experience of the user(s) consuming the online content, in particular online content embedding AD(s). Moreover, serving the cached AD(s) from the edge storage device(s) may significantly increase the overall advertising income (revenues) by reducing the cost of the network resources required for downloading the AD(s) from its origin remote network location(s). Preloading AD(s) to the edge storage device(s) during network resources low cost period(s) and serving the AD(s) to the client device(s) from the edge storage during network resources high cost period(s) may significantly reduce the cost of the network resource thus increasing the overall advertising income. Furthermore, serving the cached AD(s) from the edge storage device(s) may significantly reduce the latency and hence improve the user experience of the user(s) presented with the AD.

According to a third aspect of the present invention there is provided a computer implemented method of emulating Real Time Bidding (RTB) for a future time, comprising executing a code by one or more processors of an automated bidding system associated with one or more of a plurality of advertisers offering a plurality of ADs for:

Receiving, via a network, one or more emulated RTB requests for a future impression in one or more AD placements in online content estimated to be presented by one or more client devices to respective user(s) during a future time, the emulated RTB requests comprising one or more user attributes of the respective user(s);

Calculating a price of one or more future bid offers for one or more of the plurality of ADs selected according to the one or more user attributes;

Submitting the one or more future bid offers.

Supporting the future RTB by responding to the emulated RTB requests and submitting the future bid offer(s) may improve accuracy of the selection of the cached AD(s) which may best target (i.e. with respect to appropriateness, effectiveness, suitability, etc.) the user(s) estimated to participate in a future event.

In a further implementation form of the first and/or second aspects, the dataset comprises a hash table mapping each of the plurality of cached ADs to one or more of the plurality of user attributes. Using hash tables which are highly efficient for search and match operations as known in the art may significantly improve the effectivity of the search and match operations thus reducing the processing time for identifying matching cached ADs.

In a further implementation form of the first and/or second aspects, one or more of the plurality of cached ADs are selected from a plurality of ADs according to an RTB simulation conducted at a current time for one or more RTB requests comprising one or more of the plurality of user attributes predicted for one or more user estimated to participate in one or more future events [selecting the cached ADs according to the RTB simulation]. Selecting the cached ADs according to the RTB simulation may significantly improve the estimation accuracy of selection of ADs predicted to best target (with respect to appropriateness, effectiveness, suitability, etc.) the users estimated to participate in the future event(s).

In a further implementation form of the first and/or second aspects, the one or more users estimated to participate in one or more future events is identified by analyzing attendance information indicative of an attendance of one or more of a plurality of users at the one or more future events. Identifying the users estimated to participate in the future event(s) may allow simulating and/or emulating RTB process using actual users attributes of real users predicted to participate in the future event. Identifying and using the actual user attributes this may significantly improve accuracy of selection of ADs predicted to best target the users estimated to participate in the future event(s).

In an optional implementation form of the first and/or second aspects, the RTB simulation is conducted at a timing emulating a timing of the one or more future events. Conducting the RTB simulation during a timing similar as possible to the timing of the future event may allow for a more realistic and/or more accurate simulation of the future RTB since at least some parameters of the RTB simulation, for example, the availability and/or cost of the network resources depend on such timing, for example, time of day, day of week etc.

In a further implementation form of the first and/or second aspects, one or more of the plurality of cached ADs are selected from a plurality of ADs according to an emulation conducted at a current time for one or more emulated RTB requests comprising one or more of the plurality of user attributes predicted for one or more user estimated to participate in one or more future events by forwarding the one or more emulated RTB requests assigned with a future timing indication to one or more automated bidding systems associated with one or more of a plurality of advertisers offering the plurality of ADs, the one or more automated bidding systems are adapted to respond to the one or more emulated RTB requests with one or more future bid offers. Selecting the cached ADs according to the RTB emulation may significantly improve the estimation accuracy of selection of ADs predicted to best target (with respect to appropriateness, effectiveness, suitability, etc.) the users estimated to participate in the future event(s).

In a further implementation form of the first and/or second aspects, the dataset further associates each of the plurality of cached ADs with a respective one of a plurality of bid offer offering a price for posting the respective cached AD. Associating the cached ADs with respective bid offers may allow selecting the highest bidding offer among several bid offers associated with multiple cached ADs that are determined to match the users attributes defined by the RTB request.

In an optional implementation form of the first and/or second aspects, the cached AD(s) selected for service is associated with a respective one of the plurality of bid offers offering a highest price among a subset of the plurality of cached ADs associated in the dataset with the user attribute(s) of the respective RTB request. Selecting the highest bidding offer may increase the overall advertising income.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

According to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
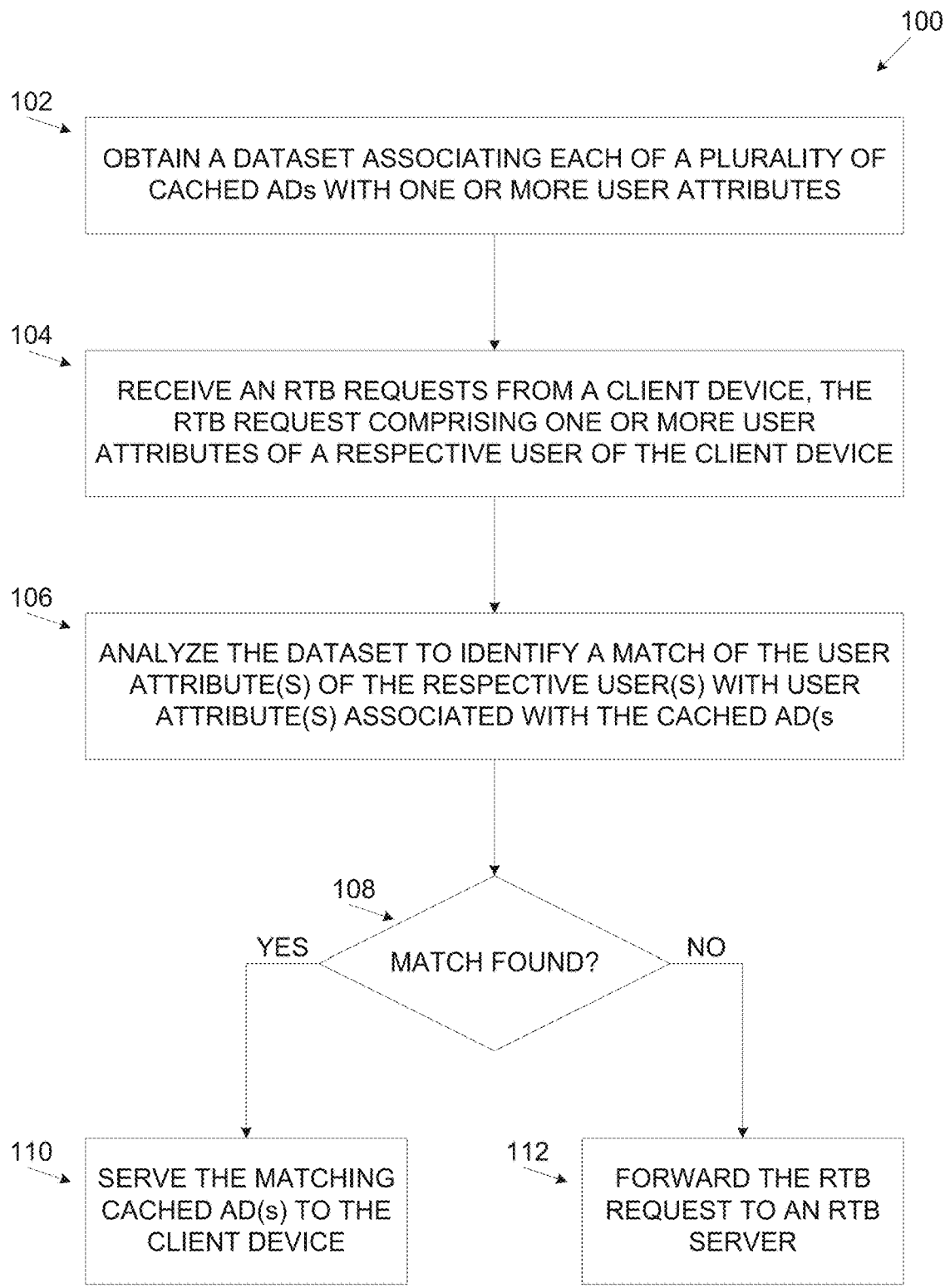
FIG. 1 is a flowchart of an exemplary process of serving RTB requests received from client devices at a network edge node, according to some embodiments of the present invention.

The present invention, in some embodiments thereof, relates to serving to real time bidding (RTB) requests at a network edge node, and, more specifically, but not exclusively, to serving to RTB requests at a network edge node based on availability of matching ADs at an edge storage.

According to some embodiments of the present invention, there are provided methods and systems for conducting a local RTB by an edge RTB node for serving ADs to one or more client devices from edge storage in response to one or more RTB requests received from the client device(s). The edge RTB node, for example, a server, a processing node, a network node and/or the like is located at an edge of the network serving the client devices, for example, a cellular phone, a Smartphone, a tablet, a laptop, a desktop, a smart watch, smart glasses and/or the like.

The edge RTB node maintains a dataset, for example, a file, a table, a list, a database, a data structure, an array and/or the like listing a plurality of cached ADs stored in one or more edge storage devices which are also edge of the network serving the client devices. The dataset associates each of the cached ADs with one or more user attributes characterizing one or more users which the respective cached AD is targets and hence has a significantly high probability of being converted (viewed, clicked, purchased, etc.) by the targeted user(s). The dataset may comprise, for example, a hash table mapping the plurality of user attributes to the plurality of cached ADs. The dataset may optionally include a bid offer for one or more of the cached ADs, specifically the bid offer may comprise a price offered by a respective advertiser for posting the respective cached AD. The dataset may further include a location indicator pointing to the location of storage of each of the cached ADs in the edge storage device(s).

The user attributes may include, for example, a personal attribute (e.g. gender, age, ethnic orientation, residence address, etc.), a client device attribute (e.g. processor type, processor speed, memory capacity, networking capability, display size, resolution, etc.) and/or the like. The user attributes may further include a geographical location. The user attributes may also include event attributes relating to one or more events and/or activities one or more users may participate and/or engage, for example, an event type, an event location and/or the like.

The RTB request(s) received from the client device(s) offer one or more impressions at one or more AD placements embedded in online content of one or more publishers presented by the client device(s) to associated user(s). The client device(s) may execute one or more AD consumption applications, for example, a web browser executing a webpage embedding the AD placement(s), a mobile application embedding the AD placement(s) and/or the like to present the online content, specifically AD(s) to the associated user(s).

Each RTB request comprises one or more user attributes of the respective user using the client device.

For each received RTB request, the edge RTB node analyzes the dataset to identify one or more cached ADs which are associated with the users attribute(s) defined (included) by the respective RTB request. In case the edge RTB node identifies one or more cached ADs which match the user attributes defined by the respective RTB request, the edge RTB node initiates service of the matching cached AD(s) to the respective client device from the edge storage device(s). In case multiple matching ADs are detected, the edge RTB node may select one of the multitude associated with a highest bid offer price. In case the edge RTB node determines that none of the cached ADs is associated with user attribute(s) matching the user attributes defined by the respective RTB request, the edge RTB node may forward the respective RTB request to one or more RTB platforms, AD exchanges, SSPs and/or the like which may serve ADs to the client device as known in the art.

It is naturally highly desirable that the cached ADs stored in the edge storage device(s) have high congruence with the users in order to increase the conversion rate for the ADs. Moreover, serving the cached ADs from the edge storage device(s) may significantly reduce the network resources cost since the AD does not need to be downloaded from its origin remote network location thus further increasing the income per AD conversion.

In order to efficiently select effective cached ADs that are estimated to best target the user(s), one or more RTB simulations may be conducted to select the cached ADs from a plurality of ADs offered by a plurality of advertisers. In particular, the RTB simulations may be conducted at a current time to simulate one or more future RTB process with respect to one or more future events by identifying and/or estimating one or more users estimated to participate (attend) in the future event(s) and extracting their user attribute(s).

The RTB simulation may be conducted at a time prior to the future event(s) to simulate an RTB process estimated to occur during the future event(s). During the RTB simulation one or more simulated RTB requests may be generated and adapted to include the user attribute(s) identified, estimated and/or extracted for one or more of the users estimated to participate in the future event(s). The simulated RTB request(s) may be forwarded to one or more AD exchanges which may perform the RTB and provide one or more bid offers submitted by one or more of the advertisers for associated ADs selected by the advertisers according to the user attribute(s) defined by the respective simulated RTB request. An optimization process may be conducted to select the cached ADs for the proposed ADs based on the price of the respective bid offers and the size of proposed ADs to reflect the cost of networking resources required for downloading the respective AD from its origin remote network location.

In order to increase accuracy of the RTB simulation, the RTB simulation may be conducted with one or more timing attributes identified for the future event(s), for example, a time of day, a day of week, a date of month and/or the like to accurately simulate the cost of network resources which may be substantially similar for similar timing parameters.

According to some embodiments of the present invention, one or more of the cached ADs are selected according to one or more RTB emulations in which one or more future RTB processes are emulated at a current time. The RTB emulation is based on the ability of the advertisers, specifically the DSP(s) associated with the advertisers to respond to emulated RTB request(s) received at a current time but directed to a future time. In response to the emulated RTB request(s), the DSP(s) may submit one or more future bid offers for one or more ADs selected according to the user attribute(s) included in the emulated RTB request(s). The construction of the emulated RTB requests may be done as done for the simulated RTB requests to include one or more user attributes identified, estimated and/or extracted for one or more of the users estimated to participate in the future event(s). The selection of the cached ADs from the ADs proposed by the advertisers may also follow the same optimization process as done for the RTB simulation. Responding to the emulated RTB requests and submitting the future bid offer(s) for emulating the future RTB may improve accuracy of the selection of the cached AD(s) which may best target (appropriateness, effectiveness, suitability, etc.) the user(s) estimated to participate in a future event.

Conducting the RTB at the network edge and moreover, serving cached ADs from the edge storage device(s) may present significant advantages and benefits compared to current systems and methods for serving ADs. First by conducting the RTB at the network edge without forwarding the RTB requests to a remote RTB platform, AD exchange and/or the like, the latency (response time) for serving the ADs to the client devices may be significantly reduced. This may significantly improve the user experience of the user(s) consuming the online content, in particular in particular online content embedding AD(s).

Moreover, serving the cached AD(s) from the edge storage device(s) may significantly increase the overall advertising income (revenues) by reducing the cost of the network resources required for downloading the AD(s) from its origin remote network location(s) since the network resources cost may typically be deducted from the price offered by the advertiser for the impression. Depending on the AD(s) size, the cost of the required network resources may be considerable thus reducing the overall income. While during the future event the cost of the network resources may be high, the cost of the network resources may be significantly lower at one or more time periods prior to the future event. Therefore, preloading AD(s) to the edge storage device(s) during network resources low cost periods and serving the AD(s) to the client device(s) during the future event from the edge storage may significantly reduce the cost of the network resource thus increasing the overall advertising income.

Furthermore, serving the cached AD(s) from the edge storage device(s) may reduce the latency and hence significantly improve the user experience of the user presented with the AD. This may be particularly evident in case of large venues (events) in which large numbers of users are located at the same time in a certain location deployed with a network infrastructure, specifically a wireless infrastructure having a given network capacity. The multitude of users may simultaneously consume online content in particular online content embedding ADs which may lead to network congestion since the given network capacity of the onsite network infrastructure may present bottlenecks. As result the latency may significantly increase thus degrading the user experience and in some scenarios ADs may potentially fail to be served to at least some of the users. Therefore preloading the cached ADs to the edge storage device(s) in advance and serving the cached AD(s) from the local edge storage device(s) may overcome the network congestion effects caused by the limited network capacity to reduce latency and/or significantly reduce no AD(s) service incidents thus significantly improving the user experience of the user(s) presented with the AD.

In addition, selecting the cached ADs according to the RTB simulation and/or the RTB emulation may significantly improve the estimation accuracy of selection of ADs predicted to best target (with respect to appropriateness, effectiveness, suitability, etc.) the users estimated to participate in the future event(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of serving RTB requests received from client devices at a network edge node, according to some embodiments of the present invention. An exemplary process 100 may be executed by an edge RTB node to locally serve RTB requests received from one or more client devices offering impressions at one or more AD placements embedded in online content presented by the client device(s) to associated user(s).

Locally serving the RTB requests at the edge RTB node located at an edge of a network without involving a remote RTB as typically done may significantly reduce the latency for serving the ADs to the users and hence significantly improving the user experience for the users consuming the ADs. Moreover, the edge RTB node may serve one or more of a plurality of cached ADs locally stored in one or more edge storage devices which are also located at an edge of a network serving a plurality of client devices. This may further reduce the latency for serving the ADs and hence further improves the user experience. Furthermore, serving the cached ADs from the edge storage device(s) may significantly reduce the cost of the network resources, for example, bandwidth, latency and/or the like required for downloading the ADs to the client device(s). Reducing and/or potentially avoiding the network resources cost may significantly increase the income for publishers of the online content.

Each of the RTB requests typically includes one or more user attributes of the associated user(s). For each RTB request the edge RTB node may analyze a dataset associating the plurality of cached ADs with one or more of a plurality of user attributes to identify one or more cached ADs associated with the user attribute(s) of the respective user(s) included in the respective RTB request. In case a matched is found, i.e. the edge RTB node detects one or more cached ADs associated with the with the user attribute(s) of the respective user(s), the edge RTB node may serve the matching cached AD(s) from the edge storage device(s). Otherwise, in case none of the cached ADs is associated with the user attribute(s) of the respective user(s), the edge RTB node may forward the RTB request to an RTB server which may initiate an RTB process to offer the impression on an AD exchange and serve a selected AD to the respective client device.

Figure 2A:
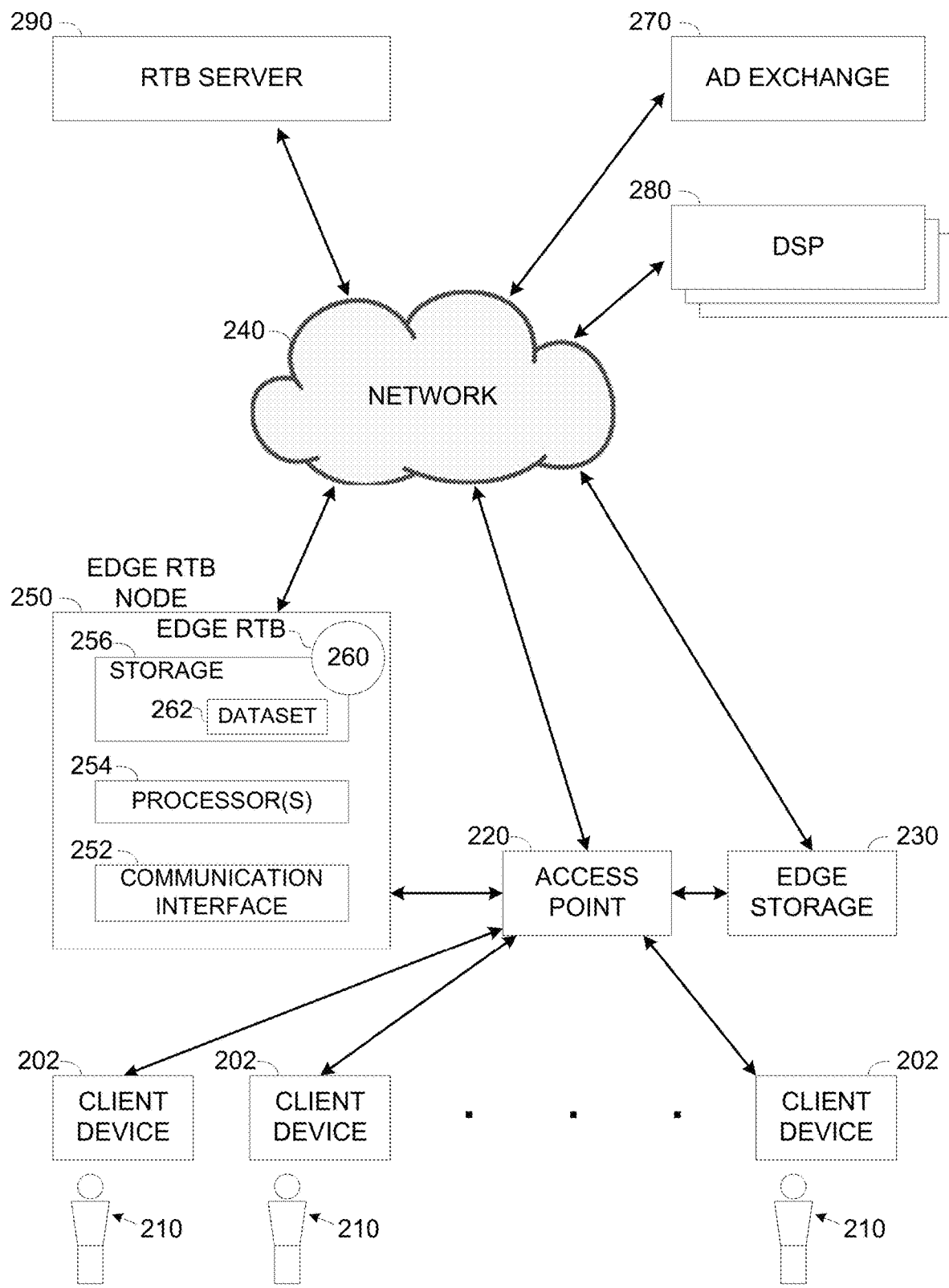
FIG. 2A, FIG. 2B and FIG. 2C are schematic illustrations of exemplary embodiments of a system for serving RTB requests received from client devices at a network edge node, according to some embodiments of the present invention.
Figure 2B:
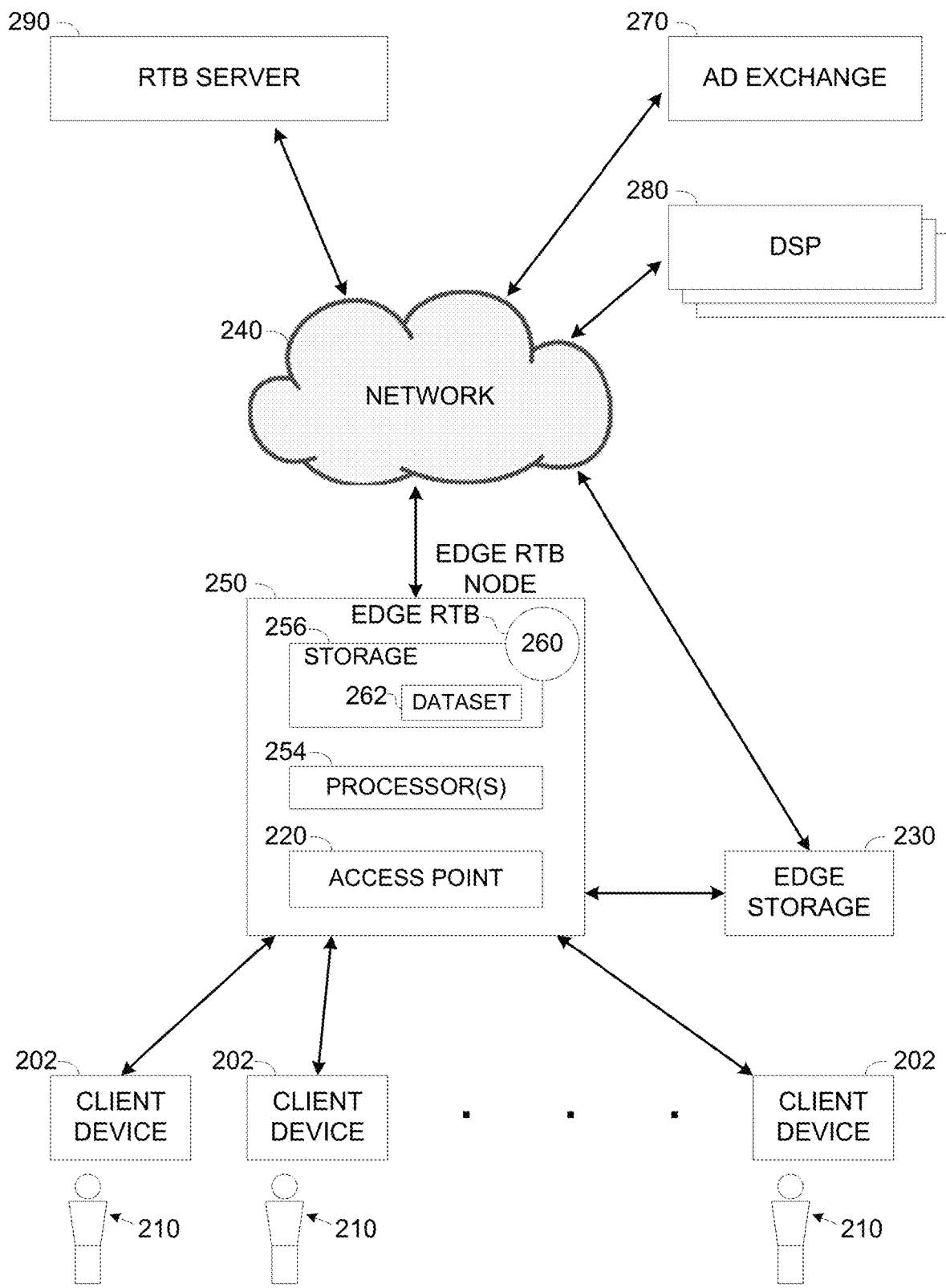
Figure 2C:
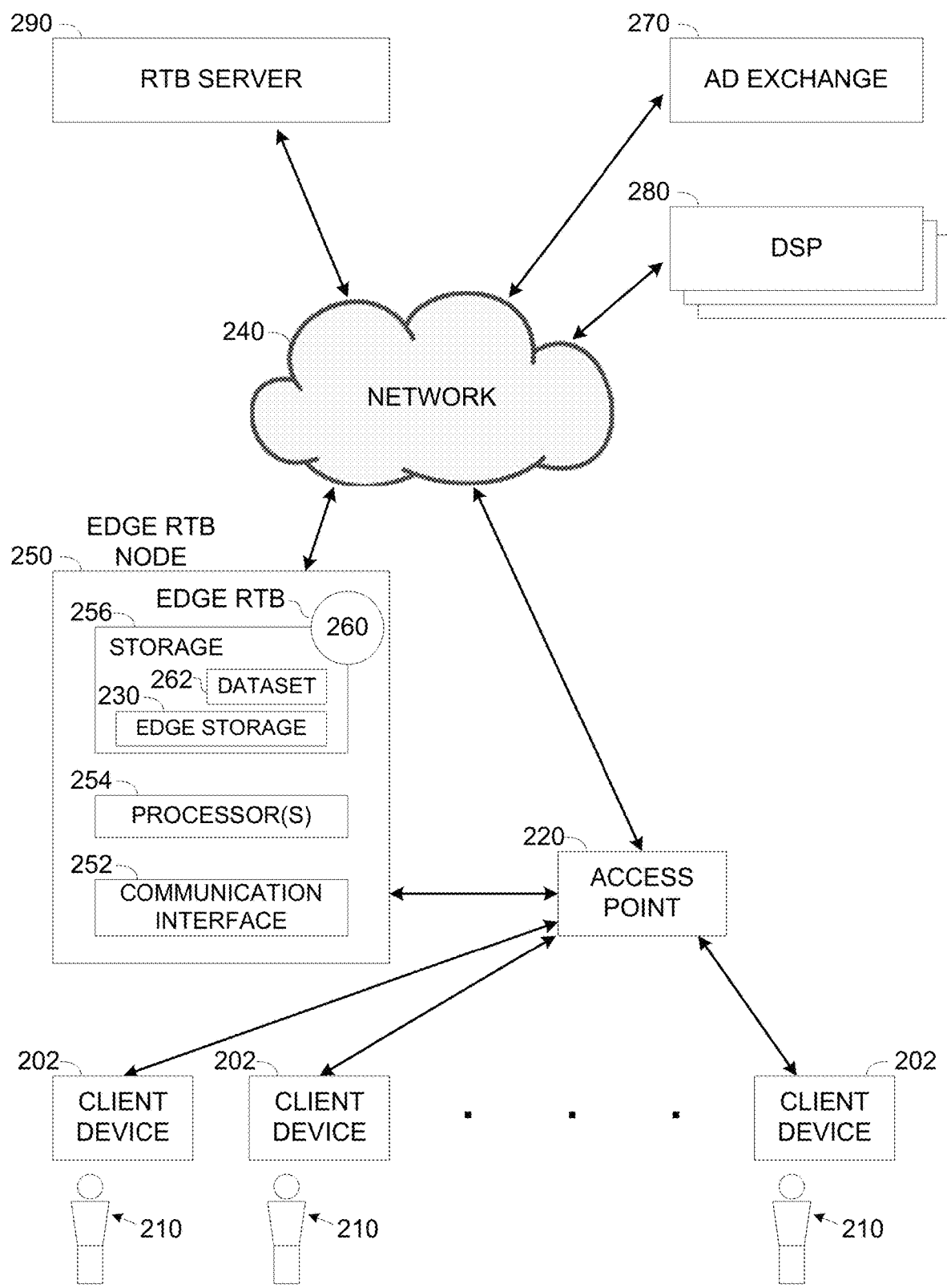

Reference is also made to FIG. 2A, FIG. 2B and FIG. 2C, which are schematic illustrations of exemplary embodiments of a system for serving RTB requests received from client devices at a network edge node, according to some embodiments of the present invention. As shown in FIG. 2A, FIG. 2B and FIG. 2C, one or more client devices 202, for example, a Smartphone, a tablet, a laptop, a desktop, a smart watch, smart glasses and/or the like associated with respective users 210 may connect to a network 240, for example, a Local area Network (LAN), a Wireless LAN (WLAN), a Wide Area Network (WAN), a Municipal Area Network (MAN), a cellular network, the internet and/or the like through one or more access points 220, for example, a router, a switch, a cellular base station and/or the like providing network connectivity to the client device(s) 202.

Each of the client devices 202 may include a communication interface, a processor(s) and storage for storing program code and/or data. The client device 202 may typically further comprise a user interface, for example, a keyboard, a pointing device, a display, a touch screen, an audio interface, a tactile interface and/or the like. The client device communication interface may include one or more wired and/or wireless network interfaces for connecting to the network 240. The client device processor(s), homogenous or heterogeneous, may include one or more processing nodes arranged for parallel processing, as clusters and/or as one or more multi core processor(s). The client device storage may include one or more non-transitory memory devices, either persistent non-volatile devices, for example, a Read Only Memory (ROM), a Flash array, a hard drive, a solid state drive (SSD), a magnetic disk and/or the like and/or one or more volatile devices, for example, a Random Access Memory (RAM) device, a cache memory and/or the like. The client device processor(s) may execute one or more software modules such as, for example, a process, a script, an application, an agent, a utility, a tool and/or the like each comprising a plurality of program instructions stored in a non-transitory medium (program store) and executed by one or more processors.

One or more of the client devices 202 having network connectivity may execute one or more an AD consumption applications presenting to the respective user(s) 210 online content provided by one or more publishers. The online content may embed one or more AD placements for posting visual ADs (e.g. images, video clips, drawings, symbols, etc.), audible ADs (e.g. audio playbacks, etc.) and/or a combination thereof. For example, one or more of the client devices 202 may execute a web browser executing a webpage embedding one or more AD placements. In another example, one or more of the client devices 202 may execute one or more mobile applications embedding one or more AD placements. The AD placements may include AD spaces for posting visual ADs (e.g. images, video clips, drawings, symbols, etc.), audible ADs (e.g. audio playbacks, etc.) and/or a combination thereof.

One or more of the client devices 202 may issue one or more RTB requests, triggered by the publisher(s)'s online content, offering for sale one or more impressions at one or more of the AD placements. The RTB requests may be received by one or more edge RTB nodes 250, for example, a server, a network node, a processing node comprising one or more processors, a cluster of processing nodes and/or the like. The edge RTB node(s) 250 is deployed at the edge of the network 240 where the client devices 202 connect to the network 240, for example, in close network proximity to the access point 220.

The edge RTB node 250 may include a communication interface 252, a processor(s) 254 for executing a process such as the process 100 and storage 256 for storing program code and/or data. The communication interface 252 may include one or more wired and/or wireless network interfaces for connecting to the network 240. The processor(s) 254, homogenous or heterogeneous, may include one or more processing nodes arranged for parallel processing, as clusters and/or as one or more multi core processor(s). The storage 256 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like. The storage 256 may further comprise one or more network storage resources, for example, a storage server, a network accessible storage (NAS), a network drive, a cloud storage and/or the like accessible via the network 240.

The processor(s) 254 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 254. For example, the processor(s) 254 of the edge RTB node 250 may execute an edge RTB application 260 to receive and handle one or more of the RTB requests transmitted by the client device(s) 202 and initiate service of the ADs to the client device(s) 202 in response to the RTB request(s). The edge RTB application 260 may use a dataset 262, for example, a file, a table, a list, a database, a data structure, an array and/or the like listing a plurality of cached ADs stored in edge storage.

The edge RTB 260 may optionally forward the RTB requests to one or more RTB servers 290 adapted to receive the RTB requests and communicate with one or more AD exchanges 270. Optionally, the RTB server 290 is implemented, integrated and/or utilized by one or more of the SSPs. Optionally, the RTB server 290 is implemented as one or more cloud computing services, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

The AD exchange(s) 270 is an automated platform for managing the trade for the AD impressions between a plurality of publishers providing the online content and offering for sale the impressions (at the AD placements) and a plurality of advertisers looking to purchase the AD impressions for posting one or more of a plurality of ADs at the respective AD placements. To support real-time trading of the AD impressions, the AD exchange(s) 270 typically communicates with automated platforms associated with the publishers, for example, supply side platforms (SSPs) and/or the like and automated platforms associated with the advertisers, for example, demand side platforms (DSPs) 280 and/or the like.

Optionally, the edge RTB 260 forwards one or more of the RTB requests directly to one or more of the AD exchanges 270.

One or more edge storage devices 230, for example, a storage media (e.g. a hard drive, etc.), a storage server, a NAS and/or the like may be deployed at the edge of the network 240 where the client devices 202 connect to the network 240. The edge storage device(s) 230 may locally store online media in particular cached ADs which are preloaded in advance to the edge storage device(s) 230 and may be served to the client device(s) 202. Since the edge storage device(s) 230 are deployed in close networking proximity to the client devices 202, i.e. near the access point of the client device(s) 202 to the network 240, the network resources required for communication between the edge storage device(s) 230 and the client device(s) 202 may typically be negligible. Moreover the latency for serving the cached AD(s) from the edge storage device(s) 230 to the client device(s) 202 may be significantly low.

According to some embodiments of the present invention, as shown in FIG. 2A, to service of the RTB requests at the network edge, the edge RTB node 250 connects to the access point 220 providing network connectivity for one or more of the client devices 202. The edge RTB node 250 may connect to the network 240 through the access point 220. However, the edge RTB node 250 may further connect to the network 240, specifically to the RTB server 290, the AD exchange 270 and/or the like through one or more different network connections. For example, while the access point 220 may be a cellular access point, for example, a base station, a node B, an evolved Node B (eNB) and/or the like providing cellular service to the client device(s) 202, the edge RTB node 250 may connect to the network 240 through one or more separate networks, for example, a LAN, a WAN and/or the like. Similarly, one or more of the edge storage devices 230 may connect to the network 240 through the access point 220 and/or through one or more different network connections. Loading the cached AD(s) to the edge storage device(s) 230 may therefore be done through the access point 220 and/or through the other (different) network connection(s).

According to some embodiments of the present invention, as shown in FIG. 2B, the edge RTB node 250 may perform as the access point 220 providing network connectivity to the plurality of client devices 202 for connecting to the network 240. For example, the edge RTB node 250 and the access point 220 may be integrated together. As described for the embodiment presented in FIG. 2A, one or more of the edge storage devices 230 may connect to the network 240 through the edge RTB node 250 operating as access point and/or through one or more different network connections. Loading the cached AD(s) to the edge storage device(s) 230 may therefore be done through the edge RTB node 250 and/or through the other (different) network connection(s).

According to some embodiments of the present invention, as shown in FIG. 2C, one or more of the edge storage devices 230 are integrated, managed, accessed and/or controlled by the edge RTB node 250. Loading the cached AD(s) to the edge storage device(s) 230 may therefore typically be done through and/or by the edge RTB node 250.

The embodiments presented in FIG. 2A, FIG. 2B and FIG. 2C are exemplary and should not be construed as limiting since other deployments may be constructed. Moreover, two or more of the deployments presented in FIG. 2A, FIG. 2B and FIG. 2C may be combined. For example, the edge RTB node 250 may integrate both the access point 220 as shown in FIG. 2B as well as one or more of the edge storage device(s) 230 as shown in FIG. 2C.

As shown at 102, the process 100 starts with the edge RTB application 260 obtaining the dataset 262 which lists a plurality of cached ADs locally stored in one or more of the edge storage devices 230. The dataset 262, for example, a file, a table, a list, a database, a data structure, an array and/or the like associates each of the cached ADs with one or more of a plurality of user attributes. The edge RTB application 260 may use the dataset 262 to search for matching AD(s) which are associated with a certain queried user attribute(s). For example, the dataset 262 may comprise a hash table mapping each of a plurality of user attributes to one or more associated cached ADs. This means that each cached AD may be correlated in the hash table with one or more user attributes such that given the queried user attribute(s) the edge RTB application 260 may efficiently and rapidly identify matching cached AD(s) that are associated with queried user attribute(s).

The dataset 262 may further include a bid offer for each of the cached ADs offering a price to be paid by a respective one of the plurality of advertisers in case the respective AD is converted, for example, viewed by the respective user 210, clicked by the respective user 210, the respective user 210 makes a purchase of the service and/or product offered by the AD and/or the like.

The dataset 262 may be created by one or more RTB servers such as the RTB server 290 which may select a subset of ADs from a plurality of ADs available from the plurality of advertisers and load the selected ADs to one or more of the edge storage devices 230 to make the subset of ADs locally available from the edge storage device(s) 230 as cached ADs. After created, the edge RTB 260 may receive the dataset 262 from the RTB server 290. Optionally, the edge RTB 260 creates the dataset 262 after the subset of cached ADs is selected from the plurality of ADs and the cached ADs are loaded to the edge storage device(s) 230.

It is naturally highly desirable to effectively target the ADs for user(s) 210 in order to increase visibility, conversion rate and/or the like. Efficiently targeting users 210 with appropriate ADs may be done by identifying the user attributes of the user(s) 210 and selecting the AD(s) accordingly such that the selected AD(s) relate to characteristics of the user, for example, a gender, an age, an occupation, an interest, a hobby, a place of residence, a current location, an activity the user(s) 210 is involved in and/or the like. The dataset 262 may therefore associate each of the cached ADs with respective one or more user attributes characterizing user(s) 210 to which the respective cached AD is estimated and/or predicted to be most effective, relevant and/or appropriate.

The user attributes may include, for example, personal attributes of users 210, attribute(s) of client devices 202 associated with the users 210, parameter(s) of a service level agreement (SLA) of the client devices 202, a browsing history of users 210, an online AD consumption history of users 210 and/or the like. The personal attributes of the user(s) 210 may include for example, a gender, an age, an ethnic orientation, a residence address and/or the like. The attributes of the associated client device(s) 202 may include for example, communication and/or networking capabilities (e.g. network connectivity capability (Wi-Fi, 3G, 4G, etc.), bandwidth capacity, etc.), computing and/or memory capabilities (e.g. processor(s) type, processor(s) speed, memory capacity, etc.), display capabilities (e.g. size, resolution, etc.) and/or the like.

The user attributes may further include a geographical location of user(s) 210, for example, a specific geolocation, a city, a neighborhood, a street, a road, a site (e.g. a stadium, a theatre, a cinema, a hotel, a museum, a hospital, a park, an attraction site, a place of interest, etc.) and/or the like.

The user attributes may also include event attributes relating to one or more events the user(s) 210 are currently participating in, for example, an event type, an event location and/or the like. The event type may include, for example, a sports event, a concert, a movie, a theater show, a happening, a gathering, a certain user(s) 210 being at a certain location and/or the like. The event attributes may further relate to one or more activates the user(s) 210 is currently engaged in, for example, a training session, a stroll in a park, a dance class and/or the like. The geographical location of the future event may define a specific location in which the event takes place, for example, a city, a neighborhood, a town, a theater, a stadium, a park, a specific geographical location and/or the like.

Identifying the user(s) 210 in advance, in particular the user attributes of user(s) 210 and selecting the cached ADs estimated to best target such user(s) 210 accordingly may significantly improve the conversion of the cached ADs. Identifying the user(s) 210, specifically the user attributes of user(s) 210 in advance may be done by identifying one or more future events expected to take place in a future time, specifically events estimated to take place in a geographical area served (covered) by the access point 220, i.e. the geographical area in which the access point 220 may provide network connectivity for client devices 202 located in the geographical area. Based on the event attributes of the future event(s), user attributes of users 210 estimated to participate in the future event(s) may be identified in advance.

Identifying the future events and optionally the users 210 estimated to participate in the future events may be done by one or more systems, platforms and/or services, for example, the RTB server 290, the edge RTB node 250, an SSD platform of one or more of the publishers, a dedicated service and/or the like.

The future event(s) may be public event(s) in which multiple users 210 are expected to participate, for example, a sports event, a concert, a movie, a theater show, a happening, a gathering and/or the like. The public event(s) planned to take place in a future time may be identified by analyzing online content relating to the future events, for example, schedules, publications, announcements, commercials, promotions and/or the like. Optionally, indication of one or more public future events may be manually provided and/or defined by one or more authorized users, operators, administrators and/or the like. Optionally, one or more users 210 expected to participate in the future event(s) are identified by analyzing attendance information relating to the future event(s). For example, assuming the future event is a basketball game, a music concert, a movie and/or the like. Ticket purchasing records, season ticket subscription records and/or the like may be analyzed to identify one or more users 210 who purchased a ticket for the future event. In another example, assuming the future event is a public gathering (e.g. a festival, a happening, a birthday party, etc.). Social media information relating to the gathering, for example, a Facebook page and/or the like may be analyzed to identify one or more users 210 who stated their attendance in the gathering, one or more users 210 who "liked" the page and/or the publication and/or the like.

The future event may further be a private event relating to a single user 210 or a small group of users 210. For example, one or more users 210 driving in a car in a certain geographical area may be expected to arrive at a certain geographical location at a certain future time. The user(s) 210 driving in the car may be identified by detecting, for example, a certain access point 220 the client device(s) 202 of the user(s) 210 is connected to, for example, a certain base station. It may be estimated that based on the route of the car, the user(s) 210 may arrive at the certain geographical location in a future time, for example, in 15 minutes.

The cached ADs may be then selected from the plurality of ADs based on the identified future event(s), specifically the event attributes identified for the future event(s) and optionally based on the user attributes identified for the user(s) 210 estimated to participate in the future event(s).

According to some embodiments of the present invention, one or more of the cached ADs loaded to the edge storage device(s) 230 are selected according to an RTB simulation, conducted at a current time, offering for sale a plurality of impressions for posting a plurality of ADs in a plurality of AD placements embedded in online content estimated to be presented by one or more client device 202 to respective user(s) 210 estimated to participate in the future event(s). The RTB simulation may be conducted by one or more systems, platforms and/or services, for example, the RTB server 290, the edge RTB node 250, an SSD platform of one or more of the publishers, a dedicated service and/or the like.

In order to accurately simulate the RTB process as predicted to take place during the future event, simulated RTB requests generated during the RTB simulation may be adapted to include the user attribute(s) identified for the user(s) 210 estimated to participate in the future event(s). For example, assuming the future event is a certain movie show in which one or more certain users 210 are estimated to participate. The user attributes of the certain user(s) 210 estimated to attend the movie show may indicate the user(s) are at a certain group age, for example, 15-25. In such case, one or more RTB requests may be generated during the RTB simulation may be adapted to have the user attribute indicating age of 15-25.

The bid offers received from the AD exchange 270 and/or submitted by the DSPs 280 for the impressions may be analyzed to identify a highest bid offer(s) and select the AD(s) associated with the highest bid offer(s) to be cached AD(s) loaded to the edge storage device(s) 230. However, since the bid offers may relate to different ADs having different size, the price of the bid offers needs to be adjusted to reflect the cost of network resources required for downloading the ADs to the client devices 202.

It should be noted that the highest bid offer(s) may not necessarily be the highest price bid offers. The price offered by the advertiser(s) in one or more of the bid offers may typically be first modified to reflect a conversion probability estimated for the AD associated with the bid offer to be actually converted. For example, assuming the price offered by a certain advertiser in a certain bid offer for a certain AD is $1.0 and further assuming it is estimated that the probability that the certain AD will be converted is 1/20. In such case the original price offered by the advertiser may be modified to reflect the estimated probability and the actual price used for the RTB simulation is therefore $1.0/20=$0.05 ($cent 5). The price offered by the bid offers as referenced herein after therefore relates to the price after modified according to the estimated conversion probability.

For each simulated RTB request, each of the received bid offers is adjusted to reflect the cost of the network resources required for downloading the respective AD based on the size of the respective AD. The selected AD may thus be the AD associated with the highest adjusted bid offer offering the highest price (after modified to reflect the conversion probability) for the respective impression among the plurality of adjusted bid offers.

Selecting the bid offer(s) offering highest price may therefore be regarded as an optimization problem which may be solved using a multi-objective optimization over multiple criteria, specifically the size of each of the ADs and the cost of the network resources required for downloading the respective AD to the edge storage device(s) 230. For example, a Pareto frontier may be calculated for a plurality of bid offers corresponding to each simulated RTB request according to the cost of the network resources and the size of the associated AD(s). Based on the calculated Pareto frontier, one or more ADs associated with highest adjusted bid offers may be selected and cached (loaded) in the edge storage device(s) 230. The optimization may further attempt to maximize the utilization of the edge storage device(s) 230 by selecting a best utilization alternative in terms of capacity of the edge storage device(s) 230 vs. potential revenue from conversion of the cached ADs.

Optionally, before calculating the Pareto frontier, one or more dominated bid offers are discarded. The dominated bid offers are bid offers dominated by one or more dominant bid offers which offer a higher price with respect to the dominated bid offer(s) and is associated with a an AD smaller in size compared to the ADs associated with the dominated bid offer(s). The dominant bid offer therefore dominates the dominated bid offer(s) since after adjusting the bid offers, the price of the dominated bid offer(s) will essentially be lower because they offer a lower price in the first place and may be subject to higher cost of network resources since they are associated with AD(s) larger in size.

Following is an example for selecting a highest bid offer among four exemplary bid offers during an exemplary RTB simulation. In response to a simulated RTB request comprising one or more user attributes, four bid offers are received from the AD exchange 270. The bid offers are associated with ADs selected by one or more of the advertisers, specifically the DSP(s) 280 according to the user attributes provided by the simulated RTB request. The bid offers are referred to herein after by their identifier, i.e. their BidID.

| BidID | BID Offer Price [$ cent] | AD Size [MB] |
| --- | --- | --- |
| 59 | 52 | 1.4 |
| 67 | 49 | 2.0 |
| 196 | 45 | 0.5 |
| 62 | 40 | 0.1 |

The RTB application 260 may identify that BidID 67 is dominated by BidID 59 because the price of BidID 67 is lower than the price of BidID 59 and the AD associated with BidID 67 is larger in size compared to the AD associated with BidID 59. The RTB application 260 may therefore discard BidID 67 from further consideration as follows:

| BidID | BID Offer Price [$ cent] | AD Size [MB] |
| --- | --- | --- |
| 59 | 52 | 1.4 |
| 196 | 45 | 0.5 |
| 62 | 40 | 0.1 |

The RTB application 260 may then adjust each of the bid offers associated with the non-cached ADs to reflect the cost of their respective required network resources.

In a first example, it is assumed the cost of the network resources is 20 cents per 1 MB, the RTB application 260 may then adjusts the bid offers as follows:

| BidID | BID Offer Price [$ cent] | AD Size [MB] | Adjusted BID Offer Price [$ cent] |
| --- | --- | --- | --- |
| 59 | 52 | 1.4 | 52 − 1.4 * 20 = 24 |
| 196 | 45 | 0.5 | 45 − 0.5 * 20 = 25 |
| 62 | 40 | 0.1 | 40 − 0.1 * 20 = 30 |

In this case the RTB application 260 may select the bid offer BidID 62 presenting the highest price after the adjustment.

In a second example, it is assumed the cost of the network resources is 10 cents per 1 MB, the RTB application 260 may then adjusts the bid offers as follows:

| BidID | BID Offer Price [$ cent] | AD Size [MB] | Adjusted BID Offer Price [$ cent] |
| --- | --- | --- | --- |
| 59 | 52 | 1.4 | 52 − 1.4 * 10 = 38 |
| 196 | 45 | 0.5 | 45 − 0.5 * 10 = 40 |
| 62 | 40 | 0.1 | 40 − 0.1 * 10 = 39 |

In this case the RTB application 260 may select the bid offer BidID 196 presenting the highest price after the adjustment.

In a third example, it is assumed the cost of the network resources is 5 cents per 1 MB, the RTB application 260 may then adjusts the bid offers as follows:

| BidID | BID Offer Price [$ cent] | AD Size [MB] | Adjusted BID Offer Price [$ cent] |
| --- | --- | --- | --- |
| 59 | 52 | 1.4 | 52 − 1.4 * 5 = 45 |
| 196 | 45 | 0.5 | 45 − 0.5 * 5 = 42.5 |
| 62 | 40 | 0.1 | 40 − 0.1 * 5 = 39.5 |

In this case the RTB application 260 may select the bid offer BidID 59 presenting the highest price after the adjustment.

The cost of the network resources is typically very dynamic and may change momentarily. The variations in the network resources cost may be monitored and the optimization process, for example, the Pareto frontier calculation may be adapted accordingly.

Optionally, in order to apply similar network resources costs the RTB simulation is conducted to have one or more event attributes that are substantially similar to the event attribute of the future event as indicated by the event attributes of the future event. While it is naturally impossible to conduct the RTB simulation at the exact same time and date as the future, it may be possible to conduct the RTB simulation with similar timing attributes as identified for the future event, for example, same time of day, same day of the week and/or same duration. For example, assuming a certain future event is a certain movie show that is planned to take place at 21:00 on Thursday of a following week. An RTB simulation may be conducted to generate simulated RTB requests offering for sale impressions during the same certain movie show taking place at 21:00 on Thursday of a current week. Applying similar event attributes during the RTB simulation as are identified for the future event may significantly increase the accuracy of the RTB simulation since the cost of the network resources is expected to be significantly similar to the network resources cost during the future event.

According to some embodiments of the present invention, one or more of the cached ADs loaded to the edge storage device(s) 230 are selected according to a future RTB emulation, conducted at a current time, for prediction of bid offers associated with at least some of the plurality of ADs available from the advertiser. During the future RTB emulation, one or more emulated RTB requests are generated for offering for sale one or more impressions for posting one or more of a plurality of ADs in one or more AD placements embedded in online content estimated to be presented by one or more client device 202 to respective user(s) 210 estimated to participate in the future event(s). The RTB emulation may be conducted by one or more systems, platforms and/or services, for example, the RTB server 290, the edge RTB node 250, an SSD platform of one or more of the publishers, a dedicated service and/or the like.

In order to predict the future bid offers, one or more automated systems and/or platforms of one or more of the advertisers, for example, the DSP 280 and/or the like may be adapted to emulate future RTBs and submit future bid offers for future impressions for posting the associated ADs at a future time. While typically the DSPs 280 are capable of submitting bid offers in real time for purchasing current impressions, one more of the DSPs 280 may be configured, modified and/or adapted to submit one or more future bid offers for future impressions of one or more ADs that will be posted in AD placements embedded in online content that will be consumed by the user(s) 210 in the future during the future event.

The emulated RTB request(s) indicating the future time of the future event may be adapted to include the user attributes which are identified for the user(s) 210 estimated to participate in the future event thus allowing the DSP(s) 280 to select appropriate ADs accordingly, i.e. to best target the user(s) 210 characterized by the users attribute(s) as defined by the RTB request(s). The future bid offers received in response to the emulated RTB request(s) may be analyzed, for example, the Pareto frontier may be calculated to select the highest bid offer among the adjusted future bid offers.

After selecting the subset of cached ADs from the plurality of ADs the cached ADs may be loaded to the edge storage device(s) 230 and the dataset 262 may be updated accordingly to reflect the cached ADs, their associated user attributes, their associated price offered by the respective advertiser(s), a location indicator of their location in the edge storage device(s) 230 and/or the like.

As shown at 104, the edge RTB 260 may receive one or more RTB requests offering for sale impressions at one or more AD placements embedded in online media presented by one or more of the client devices 202 to their associated user(s) 210. Each of the RTB requests includes one or more user attributes of the user 210 associated with the client device 202 which issued the respective RTB request.

As shown at 106, the edge RTB 260 analyzes the dataset 262 to identify one or more cached ADs which are associated with one or more of the user attributes included in the RTB request(s). The edge RTB 260 uses the user attribute(s) included in the RTB request(s) as query user attribute(s) and analyzes the dataset 262 to identify one or more cached ADs which are associated (correlated) with the queried users attribute(s). For example, assuming a certain RTB request includes user attributes indicating the respective user 210 is a 30 year old male, the edge RTB 260 may search the dataset 262 to identify one or more cached ADs which are associated with "male" and "30" user attributes. In another example, assuming a certain RTB request includes user attributes indicating the respective user 210 is currently participating in a basketball game of the New York Knicks at the Madison Square Garden. The edge RTB 260 may search the dataset 262 to identify one or more cached ADs which are associated with event attributes of "basketball game" or "New York Knicks: or "Madison Square Garden".

As shown at 108, which is a decision point, for each RTB request, in case the edge RTB 260 detects a match, i.e. one or more of the cached ADs are associated with the user attributes defined by the RTB request, the process 100 branches to 110. Otherwise, in case of no match, i.e. the edge RTB 260 determines that none of the cached ADs is associated with the user attributes defined by the RTB request, the process 100 branches to 112.

As shown at 110, the edge RTB 260 initiates serving of the selected matching cached AD(s) to the client device(s) 202 which issued the respective RTB request(s). In case, for one or more of the RTB requests, the edge RTB 260 identifies a multitude of matching cached ADs, the edge RTB 260 may select one of the cached ADs to serve the respective RTB request. For example, the edge RTB 260 may select a cached AD associate with a highest bid offer offering a highest price among a plurality of bid offers associated with the multitude of matching cached ADs.

The edge RTB 260 may initiate serving the selected cached AD(s) to the client device(s) 220 which issued the respective RTB. For example, the edge RTB 260 may provide a location indicator (e.g. a link, an address, etc.) pointing to the selected cached AD(s). The edge RTB 260 may obtain the location indicator for the selected cached AD(s) from the dataset 262 listing the cached ADs. Serving the cached ADs is transparent to the user(s) 210 since no degradation is inflicted to the user experience of the user(s) 210 presented with the served cached ADs. In practice the user experience may potentially be improved since the latency for delivering the cached ADs from the edge storage device(s) 230 may be significantly lower compared to the latency of serving a similar AD from its origin remote network location.

As shown at 112, the edge RTB 260 forwards the RTB request(s) to one or more of the RTB servers 290 which may initiate an RTB with the AD exchange(s) 270. Optionally, the edge RTB 260 forwards the RTB request(s) to one or more of the AD exchanges 270. Optionally the RTB application 260 forwards the RTB requests to one or more aggregators of publishers, for example, an SSP which in turn forwards the RTB requests to the AD exchange 270. The AD exchange(s) 270 may conduct a bidding process for the RTB request(s) and may select a winning bid offer and serve the respective AD(s) to the client device(s) 220.

As described herein above, according to some embodiments of the present invention, one or more of the cached ADs loaded to the edge storage device(s) 230 are selected according to a future RTB emulation, conducted at a current time, for prediction of bid offers associated with at least some of the plurality of ADs available from the advertiser.

Figure 3:
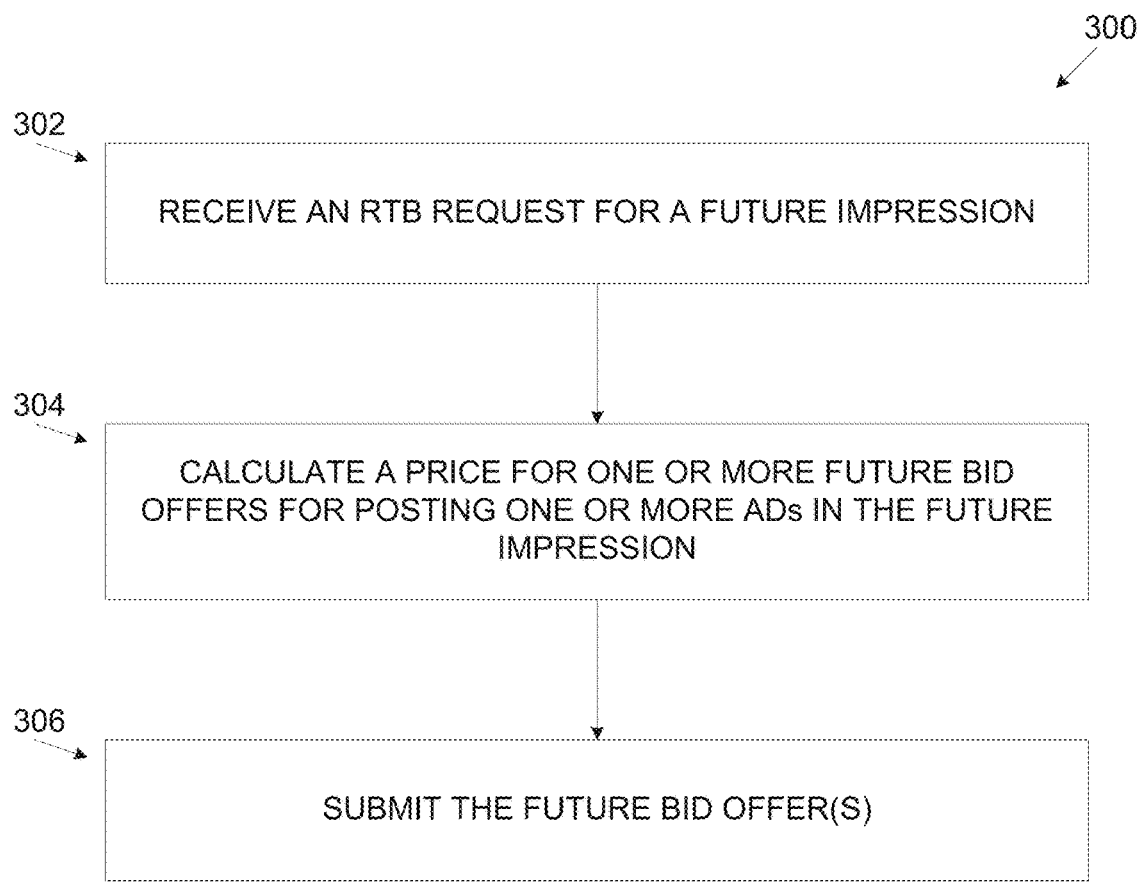
FIG. 3 is a flowchart of an exemplary process of providing future bid offers in response to a current time RTB request, according to some embodiments of the present invention.

Reference is now made to FIG. 3, which is a flowchart of an exemplary process providing future bid offers in response to a current time RTB request, according to some embodiments of the present invention. An exemplary process 300 may be executed by one or more automated systems and/or platforms of one or more of the advertisers, for example, the DSP 280 and/or the like adapted to emulate future RTBs. The DSP(s) 280 may emulate bid offers submission for future impressions for posting the associated ADs at a future time. The process 300 may be conducted during an emulation of a future RTB in which one or more emulated RTB requests are generated at a current time and assigned with a future time.

As shown at 302, the process 300 starts with the DSP 280 receiving one or more emulated RTB requests offering to bid on future impressions at one or more AD placements embedded in online media estimated to be presented by one or more client devices such as the client device 202 to their associated user(s) such as the user 210. Each RTB request is assigned with future time and includes one or more user attributes estimated and/or predicted for one or more users 210.

As shown at 304, for each emulated RTB request, the DSP 280 selects one or more ADs estimated to best target the user 210 based on the user attribute(s) defined by the respective RTB request.

For each RTB request, the DSP 280 further calculates a price for a future bid offer for each selected AD.

As shown at 306, the DSP 280 may submit the future bid offer(s) for one or more of the emulated RTB requests.

Advertisers may be motivated to adapt their DSP(s) 280 to emulate bid offers for future impressions since this may require a relatively minor effort while the ability to emulate future bid offers may significantly improve the probability that AD(s) of the advertiser are preloaded to the edge storage device 230 and may therefore have a higher probability of being served to the user(s) 210 during the future event(s) thus receiving higher visibility and potentially increasing the conversion rate and hence their income.

Figure 4:
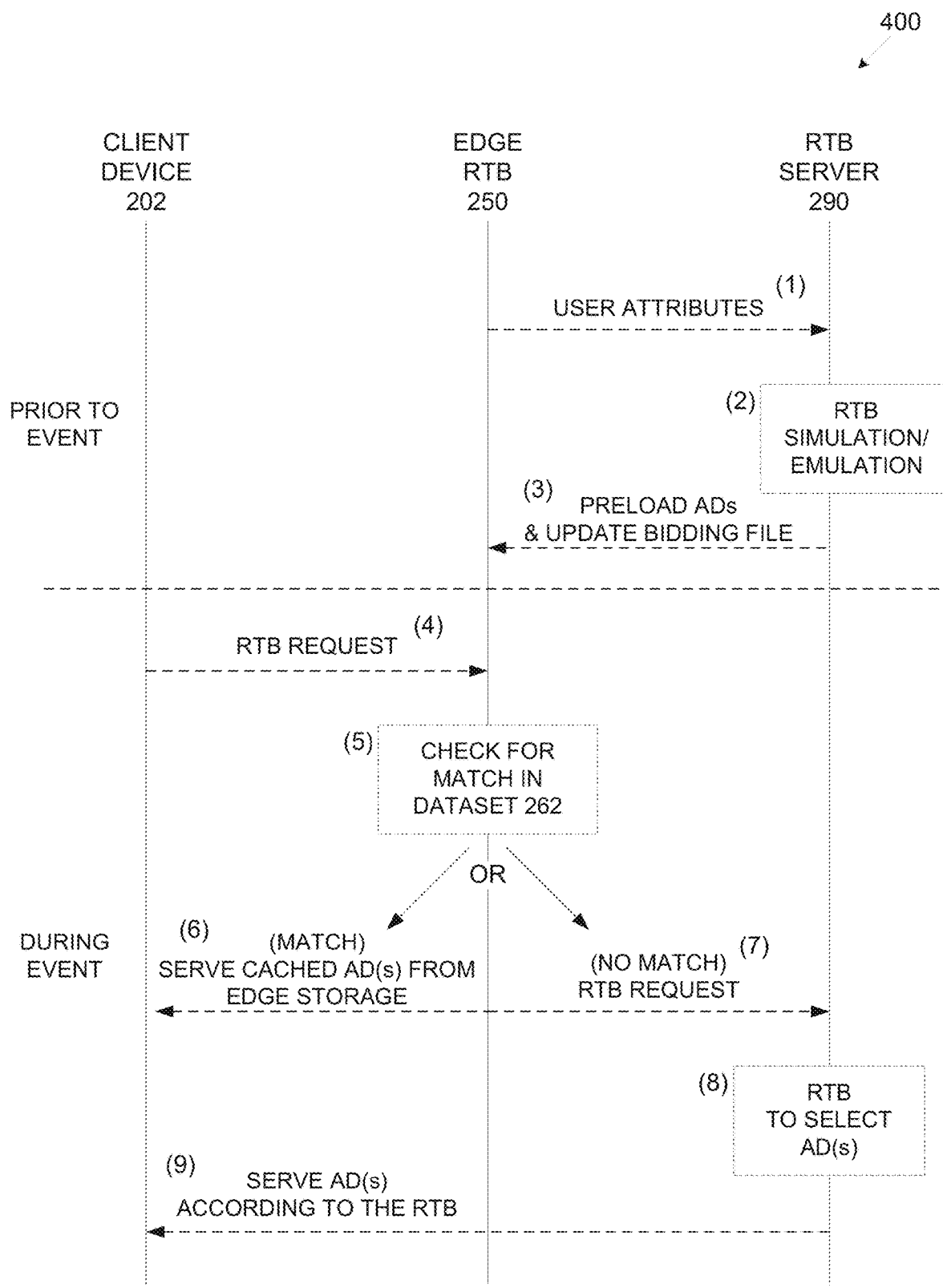
FIG. 4 is a schematic illustration of an exemplary sequence of serving RTB requests received from client devices at a network edge node, according to some embodiments of the present invention.

Reference is now made to FIG. 4, which is a schematic illustration of an exemplary sequence of serving RTB requests received from client devices at a network edge node, according to some embodiments of the present invention. An exemplary sequence 400 presents a sequence of a process such as the process 100 executed by an edge RTB application such as the edge RTB 260 for serving RTB requests received from one or more client device such as the client device 202. As shown, the sequence 400 starts with extracting and/or identifying user attributes (1) of one or more users such as the user 210 estimated to participate in one or more future events as described in step 102 of the process 100. While the sequence 400 suggests the user(s) attributes are identified by the edge RTB node 250, the user(s) attributes may be identified by one or more additional and/or other systems, for example, the RTB server 290, the SSP of the publisher(s), an aggregated SSP and/or the like. An RTB simulation and/or emulation (2) of a future RTB may be conducted to select one or more cached ADs from a plurality of ADs offered by a plurality of advertisers as described in step 102 of the process 100. The cached ADs selected based on the simulation and/or emulation of the future RTB are loaded (3) to one or more edge storage devices such as the edge storage device 230 and a dataset such as the dataset 262 is updated accordingly as described in step 102 of the process 100. The edge RTB 260 may receive one or more RTB requests (4) from one or more of the client devices 202 as described in step 104 of the process 100 where each RTB request comprises one or more user attributes of the respective user(s) 210. For each RTB request, the edge RTB 260 checks the dataset 262 (5) to detect one or more cached ADs associated with the user attributes defined by the respective RTB request as described in step 106 of the process 100. For each RTB request, in case the edge RTB identifies one or more cached ADs associated with user attributes defined by the respective RTB, the edge RTB 260 initiates service (6) of the matching cached AD(s) as described in step 110 of the process 100. Otherwise in case the edge RTB 260 determines none of the cached ADs is associated with the user attributes defined by the respective RTB request, the edge RTB 260 forwards (7) the RTB request to an AD exchange such as the AD exchange 270 as described in step 112 of the process 100. In response to the RTB requests, one or more ADs may be selected during the RTB (8) and served (9) to the respective client device(s) 202 which initiated the respective RTB request as described in step 112 of the process 100.

It is expected that during the life of a patent maturing from this application many relevant systems, methods and computer programs will be developed and the scope of the terms client device, SSP and DSP are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of serving Real Time Bidding (RTB) requests received from client devices at a network edge node, comprising:
   executing a code by at least one processor of an edge node located at an edge of a network where at least one client device connects to the network for:
      during a network resources low cost period, preloading, from at least one remote server to at least one edge storage device locally accessible to the edge node, a subset of ADs selected from a plurality of ADs stored by the at least one remote server, wherein the subset of ADs are stored in the at least one edge storage device as a plurality of cached ADs;
      obtaining a dataset associating each of the plurality of cached ADs stored in the at least one edge storage device with at least one of a plurality of user attributes, wherein the dataset comprises a hash table mapping each of the plurality of cached ADs to at least one of the plurality of user attributes;
      receiving, from the at least one client device via the network, at least one RTB request for an impression in at least one AD placement presented by the at least one client device to a respective user, the at least one RTB request comprising at least one of the plurality of user attributes of the respective user;
      determining that none of the plurality of cached ADs is associated with the at least one attribute; and
      forwarding the RTB request to an RTB server in response to determining that none of the plurality of cached ADs is associated with the at least one attribute, wherein the RTB server calculates a Pareto frontier for a plurality of bid offers according to a monetary cost of network resource usage required for downloading each non-cached AD to the at least one client device and a size of each non-cached AD;
   wherein the subset of ADs are selected from the plurality of ADs for preloading to the at least one edge storage device using an RTB simulation which:
      identifies a future event including a time of the future event,
      identifies users estimated to participate in the future event,
      determines a simulation time occurring prior to the time of the future event and similar to the time of the future event whereby a cost of network resources at the simulation time is expected to be similar to a network resources cost during the future event;
      at the simulation time, simulates a plurality of RTB requests that include attributes of the users estimated to participate in the future event, the RTB requests corresponding to simulated impressions for AD placement, receives bid offers responsive to the plurality of simulated RTB requests, the bid offers corresponding to ADs to be presented for the simulated impressions, and selects, as the subset of ADs from the plurality of ADs for preloading to the at least one edge storage device, ADs corresponding to highest bids of the received bid offers and having a collective size that is within an available capacity of the at least one edge storage device, and preloads the selected subset of ADs to the at least one edge storage device prior to the time of the future event.

2. The method of claim 1, wherein the users estimated to participate in the future event is identified by analyzing attendance information indicative of an attendance of at least one of a plurality of users at the future event.

3. The method of claim 1, wherein the dataset further associates each of the plurality of cached ADs with a respective one of a plurality of bid offer offering a price for posting the respective cached AD.

4. A system for serving Real Time Bidding (RTB) requests received from client devices at a network edge node, comprising:

a storage storing a code; and at least one processor of an edge node located at an edge of a network where at least one client device connects to the network, the at least one processor is coupled to the storage for executing the stored code, the code comprising:

code instructions to, during a network resources low cost period, preload, from at least one remote server to at least one edge storage device locally accessible to the edge node, a subset of ADs selected from a plurality of ADs stored by the at least one remote server, wherein the subset of ADs are stored in the at least one edge storage device as a plurality of cached ADs;

code instructions to obtain a dataset associating each of the plurality of cached ADs stored in the at least one edge storage device with at least one of a plurality of user attributes, wherein the dataset comprises a hash table mapping each of the plurality of cached ADs to at least one of the plurality of user attributes;

code instructions to receive, from the at least one client device via the network, at least one RTB request for an impression in at least one AD placement presented by the at least one client device to a respective user, the at least one RTB request comprising at least one of the plurality of user attributes of the respective user;

code instructions to determine that none of the plurality of cached ADs is associated with the at least one attribute; and code instructions to forward the RTB request to an RTB server in response to determining that none of the plurality of cached ADs is associated with the at least one attribute, wherein the RTB server calculates a Pareto frontier for a plurality of bid offers according to a monetary cost of network resource usage required for downloading each non-cached AD to the at least one client device and a size of each non-cached AD;

wherein the subset of ADs are selected from the plurality of ADs for preloading to the at least one edge storage device using an RTB simulation which:

identifies a future event including a time of the future event, identifies users estimated to participate in the future event, determines a simulation time occurring prior to the time of the future event and similar to the time of the future event whereby a cost of network resources at the simulation time is expected to be similar to a network resources cost during the future event;

at the simulation time, simulates a plurality of RTB requests that include attributes of the users estimated to participate in the future event, the RTB requests corresponding to simulated impressions for AD placement, receives bid offers responsive to the plurality of simulated RTB requests, the bid offers corresponding to ADs to be presented for the simulated impressions, and selects, as the subset of ADs from the plurality of ADs for preloading to the at least one edge storage device, ADs corresponding to highest bids of the received bid offers and having a collective size that is within an available capacity of the at least one edge storage device, and preloads the selected subset of ADs to the at least one edge storage device prior to the time of the future event.

\* \* \* \* \*